(12) United States Patent
Solh et al.

(10) Patent No.: US 9,870,521 B1
(45) Date of Patent: Jan. 16, 2018

(54) SYSTEMS AND METHODS FOR IDENTIFYING OBJECTS

(71) Applicant: Amazon Technologies, Inc., Seattle, WA (US)

(72) Inventors: Mashhour Solh, San Jose, CA (US); Yue Liu, Brighton, MA (US); Gordon Lee, Cambridge (GB); Bryan Taylor, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 15/084,341

(22) Filed: Mar. 29, 2016

(51) Int. Cl.
*H04N 5/225* (2006.01)
*G06K 9/62* (2006.01)
*G06K 9/46* (2006.01)
*G06T 7/40* (2017.01)
*G06T 3/40* (2006.01)
*H04N 5/232* (2006.01)
*G06K 9/00* (2006.01)
*G06T 7/00* (2017.01)
(Continued)

(52) U.S. Cl.
CPC ....... *G06K 9/6267* (2013.01); *G06K 9/00335* (2013.01); *G06K 9/00362* (2013.01); *G06K 9/00442* (2013.01); *G06K 9/4652* (2013.01); *G06K 9/4661* (2013.01); *G06K 9/52* (2013.01); *G06K 9/6215* (2013.01); *G06T 3/40* (2013.01); *G06T 7/0042* (2013.01); *G06T 7/2033* (2013.01); *G06T 7/408* (2013.01); *G06T 7/60* (2013.01); *H04N 5/2256* (2013.01); *H04N 5/232* (2013.01); *G06T 2207/20021* (2013.01); *G06T 2207/20224* (2013.01); *G06T 2207/30196* (2013.01)

(58) Field of Classification Search
CPC .......... G06K 9/00362; G06K 9/00221; G06K 9/00375; G06K 9/62
See application file for complete search history.

(56) References Cited

U.S. PATENT DOCUMENTS

| | | | |
|---|---|---|---|
| 2004/0190776 A1* | 9/2004 | Higaki | G06K 9/00375 382/190 |
| 2005/0162523 A1* | 7/2005 | Darrell | G06F 17/30864 348/211.2 |

(Continued)

*Primary Examiner* — Twyler Haskins
*Assistant Examiner* — Dwight C Tejano
(74) *Attorney, Agent, or Firm* — Eversheds Sutherland (US) LLP

(57) ABSTRACT

Systems, methods and devices for automatically cropping images taken by an electronic device in order to determine the identity of a product contained in the image are described herein. A number of different techniques may be applied to perform the automatic cropping, including a focus sweep technique in which a first image is analyzed for the presence of a human being and then a second image is taken in a plane closer to the camera than the first image. The two frames are analyzed and a resultant image is provided that avoids the regions in which the human being is present to focus on the product. In other embodiments, a motion vector calculation is made between two images in which an individual is holding a product. The motion vectors related to the human are removed and a bounding box is calculated to reduce the size of the image to include a higher percentage of the product, such that the product can be more easily identified.

18 Claims, 10 Drawing Sheets

(51) Int. Cl.
*G06T 7/20* (2017.01)
*G06K 9/52* (2006.01)
*G06T 7/60* (2017.01)

(56) References Cited

U.S. PATENT DOCUMENTS

| | | | |
|---|---|---|---|
| 2006/0115157 A1* | 6/2006 | Mori | G06K 9/00221 382/190 |
| 2014/0100997 A1* | 4/2014 | Mayerle | G06Q 30/0643 705/27.2 |

* cited by examiner

SYSTEMS AND METHODS FOR IDENTIFYING OBJECTS

BACKGROUND

As the capabilities of electronic devices has increased, the various functions that such electronic devices may be used for has also increased. Assistance in common, every day interactions, therefore, is one additional function that these electronic devices are being used for.

DETAILED DESCRIPTION

Figure 1:
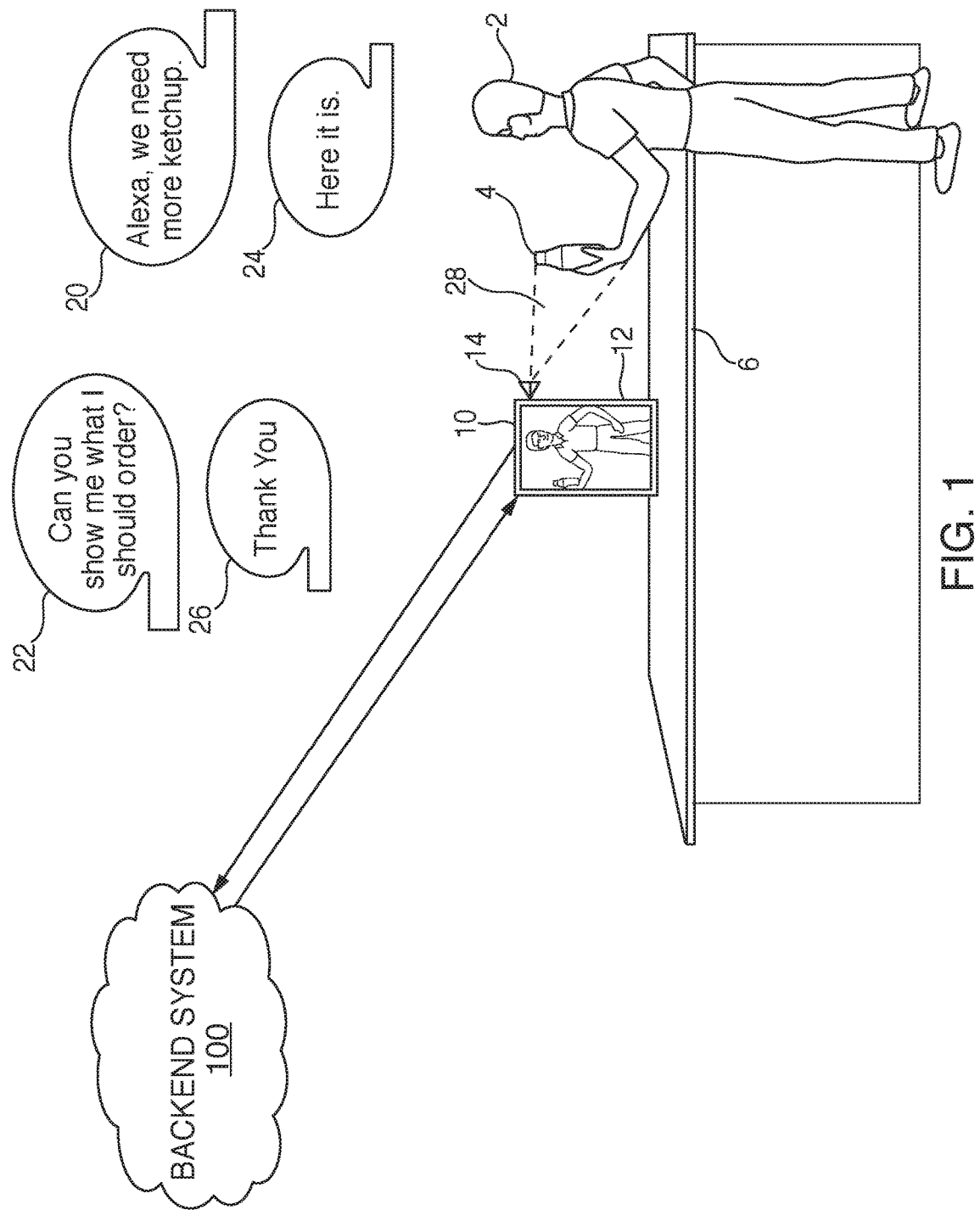
FIG. 1 is an illustrative diagram of a system for identifying objects, in accordance with various embodiments.

The present disclosure, as set forth below, is generally directed to various embodiments of methods and devices for identifying objects using an electronic device. Such electronic device may include a camera that can take still images and/or record video. An individual may place an object in proximity to the camera (such as, for example and without limitation, anywhere from three feet away to as close as six inches, or closer depending on the optics on the camera), and the electronic device may capture one or more images or videos, and may use these images or videos to identify the object. In some embodiments, the electronic device can take one or more images of the object, and automatically adjust the images to focus in on a region of interest surround the object, such that the identity of the object can be determined, as well as any specific information about the object in question. For example, a size, UPC bar code, or text written on the object may be identifiable using an image focused in on the region of interest with which the product is included.

In some embodiments, a location of an individual within the one or more images may be determined. Using the location of the torso, hands of the individual may also be identified. In some embodiments, an object may be identified as being separate and distinct from the hands. For example, a skin tone of the individual may be determined based on a location of an individual's face in relation to the individual's torso. Using the individual's skin tone and the location of the hand, the object identify may be determined. In some embodiments, adjustments to the image may be employed to accommodate for a wide range of perspectives in which the individual can hold the object from the camera. By providing a wide range both in terms of distance and with regard to side-to-side (from the center of the camera lens), the individual will more easily be able to successfully place the object at a location where it can be identified.

As one illustrative example, an individual may, be cooking in their kitchen and run out of a certain product, such as ketchup. That individual may activate their voice activated electronic device using a wakeword followed by a command or instruction (e.g., "Alexa—Please add ketchup to my shopping list."). In response to being activated, the voice activated electronic device may ask the user to place the ketchup within range of one or more cameras located thereon. The voice activated electronic device may send image data representing the one or more images to a backend system. The backend system may then recognize the object within the one or more images based on a determined location of the individual's hand within the one or more images. An object database may then be searched for a corresponding reference item that is determined to match the object. Object information may then be obtained from the object database corresponding to the matched reference item, and the object information may be sent back to the voice activated electronic device. Using the aforementioned example, the shape of the ketchup bottle may be matched to a reference item of the ketchup bottle, and that ketchup bottles information may be provided to the voice activated electronic device. Furthermore, other potentially helpful information, such as the particular style of product, size of the product, UPC bar code, may be provided with the object information.

In one embodiment, an image may be received from an electronic device in order to identify which portions of the image includes a part, or parts, of a human body. A region of interest may then be determined such that an amount of the part or parts of the human within the image would be minimized or eliminated when the image is cropped in accordance with the region of interest. In one example embodiment, identification of human body portions may be determined based on a skin tone of the individual holding the object proximate to the electronic device. Using the skin tone, smaller body parts, such as hands and fingers, may be determined which might otherwise be difficult to identify. The identified body parts may then be removed from the image to eliminate extraneous image information that could have a negative impact on the ability to accurately and quickly identify the product at issue.

In some embodiments, after identifying the human body within the image, a region of interest ("ROI") may be generated that assumes the human body is in the background and the object to be identified is in the foreground. The region of interest, therefore, may be used to captured another image, or focus on a previously captured image, in the foreground. The image can then be cropped and an object within the image may be determined using the resultant focused image. It will be understood that actual cropping need not, in fact, occur provided that the object determination process occurs on the portion of the image in the region of interest. This may increases the likelihood that a positive identification can be made, and may also increase the likelihood that additional object information may be obtained. Moreover, by reducing a size of the image that is to be analyzed, and thus reducing an amount of background information that may be present in the image, an overall temporal duration for identifying the object may be reduced, as overall latencies are reduced.

In some embodiments, first image data representing a first image may be received and human body parts may be identified within the first image. Based on the identified human body parts, second image data representing a second image may also be received. The first image data and the second image data may be processed together to determine initial motion vectors. The motion vectors within the regions having the human body parts may then be filtered out, leaving only non-human body part regions (unless additional human body parts were not detected). The resultant motion vectors may then be used to determine a region of interest for which cropping of the first image and/or second image may occur. Using the region of interest, a determination of the object therein may occur.

In some embodiments, first image data representing a first image may be received and analyzed to determine where high frequency edges exist within the first image. Portions of first image having the highest frequency edges may therefore have a high likelihood of being associated with an object in the foreground. These portions may then be selected, and a region of interest encompassing the selected foreground object may occur. Using the region of interest, the first image may be cropped, and a determination of the object within the region of interest may be made.

In some embodiments, multiple images can be used to determine a region of interest. For instance, first image data representing a first image may be received, and a flash may be generated by a camera of the electronic device at the location of the first image. In response to the flash being generated, second image data representing a second image may be captured. The first image data and the second image data may then be compared such that locations in the first and second images having the brighter reflections may be determined to correspond to a foreground. Accordingly, a region of interested may be generated that encompass all of portions of the first and second images that have brighter reflections, and cropping of those portions may occur. An objects identify may then be determined, as described above, based on the portion of the first and second images within the region of interest.

In some embodiments, one or more images may be captured by a camera of the electronic device at a time when the device is otherwise idle, such as in the middle of the night, for example, and may be saved for future reference. In response to an individual activating their electronic device (e.g., using the wakeword and making an appropriate request—"Alexa, we need more ketchup," or by pressing an activation button) the electronic device may respond by asking the individual to hold the object in front of the camera. At that time, the electronic device may capture a current image, and may send current image data representing the current image to a backend system. The backend system may receive the current image data, and may subtract the saved idle image(s) from the current image. The resultant information may then be used to generate a region of interest for cropping the current image such that the region of interest is focused on the object. A determination of the object's identify that is being held in front of the camera can then be made.

Multiple images (e.g., two or more images) may also be taken at different depths-of-field as part of a focus sweep process. The different images may be used to form a depth map, which may be utilized to generate a region of interest including a foreground object or objects. In the illustrative embodiment, a balanced decision, which may change over time, may be made as processing power and network communications become more powerful and faster. For example, due to inherent latencies, it may only be practical to utilize two different depth-of-field images. However, it may be possible to obtain and process three or more images, which may result in a more accurate region of interest, and therefore may increases a likelihood of a positive and accurate identification of the object within the images.

In some embodiments, various combinations of the above-described systems, devices, and methods can be applied at the same time to further increase the likelihood of a successful and speedy determination of the object's identity and any additional object information that can also be obtained. Under such circumstances, two, three, or four of the aforementioned descriptions may be applied, each of which can result in one or more regions of interest defining a portion of an image in which it is more likely that the object is displayed, thereby increasing a likelihood of successful identification. Each of the resultant bounding boxes may be processed together by a fusion of the resulting approaches. That fusion may include averaging the multiple region of interests to form a refined region of interest, or the fusion may take the minimum dimensions from each one of the regions of interest to generate a resultant region of interest. However, it may be advantageous to take the maximum dimensions from each region of interest to form a resultant region of interest. Alternatively, it may be practical to align centers of the resultant regions of interest to obtain a center-weighted average, and then use that center-weighted average to generate a resultant region of interest. For example, a first region of interest may be generated utilizing a focus sweep, while a second region of interest may be generated utilizing a high frequency edge approach. A third region of interest may also be generated using a multi-image flash/no-flash process, while a fourth region of interest may be generated utilizing a motion vector approach. The four resultant regions of interest can simply be aggregated together to produce an average region of interest that provides a more accurate assessment of a location of an object to be identified, as well as improving a likelihood of successful identification of that object.

In some embodiments, the electronic device may be a sound controlled electronic device. A sound controlled electronic device, as described herein, is a device capable of being activated in response to detection of a specific sound (e.g., a word, a phoneme, a phrase or grouping of words, or any other type of sound, or any series of temporally related sounds). For example, a voice activated electronic device is one type of sound controlled electronic device. Such voice activated electronic devices, for instance, are capable of obtaining and outputting audio data in response detecting a wakeword.

In some embodiments, the electronic device may be a manually activated electronic device. A manually activated electronic device, as described herein, is a device capable of being activated in response to a manual input from an individual (e.g., pressing a button, touching a portion of a touch screen, performing an action on a device). For example, a tap-to-talk electronic device is one type of manually activated electronic device. Such tap-to-talk electronic devices, for instance, are capable of obtaining and outputting audio data in response to a button being pressed by an individual.

Spoken voice commands, in some embodiments, are prefaced by a wakeword, which may also be referred to as a trigger expression, wake expression, or activation word. In response to detecting the wakeword, a voice activated electronic device is configured to detect and interpret any words that subsequently follow the detected wakeword as actionable inputs or commands. In some embodiments, however, the voice activated electronic device may be activated by a phrase or grouping of words, which the voice activated electronic device may also be configured to detect, and therefore the voice activated electronic device may also be able to detect and interpret any words subsequently following that phrase.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated electronic device may be any series of temporally related sounds.

In some embodiments, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activate electronic device, which in turn may activate a burglar alarm.

FIG. 1 is an illustrative diagram of a system for determining the identity of a product that an individual presents to an electronic device, in accordance with various embodiments. In one exemplary embodiment, individual 2 may ask a first command 20, which may be detected by an electronic device such as voice activated electronic device 10. Command 20 may include a wakeword which is subsequently followed by a question. For example, individual 2 may say, "Alexa, we need more ketchup," referring to 'empty' ketchup bottle 4 (bottle 4 may indeed be empty, or it may be nearly empty, or individual 2 may simply want to order more ketchup regardless of the amount of ketchup still available in bottle 4). In response to detecting a wakeword, such as "Alexa," voice activated electronic device 10 may begin recording audio. The recorded audio may include all of command 20, such as the wakeword plus the question, or it may only include a portion of command 20 occurring after the wakeword's command, the question.

In some embodiments, electronic device 10 may be a manually activated electronic device. In this particular scenario, instead of providing a voice command include a wakeword, individual 2 may instead press a button, tap on a screen, or provide any other user input to electronic device 10 that caused electronic device 10 to become activated (e.g., not in an idle or sleep state). For example, in response to pressing a button located on electronic device 10, individual 2 may speak command 20. However, in this example, command 20 need to not include a wakeword as no vocal trigger may be needed.

Voice activated electronic device 10, which may be located, for example, on counter 6, can include a video display screen 12, and a camera 14. Device 10, upon becoming activated, may then provide backend system 100 with audio data representing command 20 (or a portion of command 20). As described in greater detail below, backend system 100 may execute speech-to-text functionality on the audio data, thereby generating text data representing command 20. After the text data is generated, natural understanding functionality may be employed to determine a user intent for command 20 and, based on the determined user intent, an appropriate category server or skill may be accessed. For example, the user intent of command 20 may be a request for the local weather. In the example shown in FIG. 1, however, individual 2 may requesting assistance to obtain additional ketchup. The assistance may vary, depending on the preferences that the user has previously set up, or that were provided as part of a default configuration. For example, individual 2 may have an individual preference for questions like a question included within command 20 so that the requested item ultimately gets added to a household shopping list. Alternatively, the individual preference may be for backend system 100 to automatically order a predefined quantity of whatever product is determined.

In response to receiving audio data representing command 20, backend system 100 may send responsive audio data to voice activated electronic device 10, which may be output from one or more speakers of electronic device 10 as audio response message 22—"Can you show me what I should order?" Individual 2 can then hold up an object, which in this case may be ketchup bottle 4, in front of camera 14 of voice activated electronic device 10. In accordance with various embodiments disclosed herein, individual 2 may be located within a wide range of available locations in front of camera 14. For instance, individual 2 may be located within a range 28 in front of camera 14. In some embodiments, camera 14 may be capable of capturing images corresponding to objects located as close as six inches away from camera 14, or as far away as three feet, however these distances are merely exemplary as the actual distances may also vary depending on the optics on camera 14. In some embodiments, an image of what is available to be captured by camera 14, or an image of what is to be captured by camera 14, can be displayed on screen 12, as is shown in FIG. 1. In fact, the illustration on screen 12 in FIG. 1 shows one advantage of the disclosures herein, in that the display of bottle 4 on screen 12 occupies a small percentage of the overall image that is to be captured by camera 14. As is described in more detail below, in various embodiments the initial image that can be seen on screen 12 may be provided to backend system 100 to determine a region of interest ("ROI") surrounding bottle 4. In general, however, the ROI may surround some or all of an object or objects to be identified by backend system 100. The ROI, in one exemplary embodiment, may further correspond to a bounding box, or bounding region, and may be used to crop the captured image such that one or more resultant images more accurately depicts the object, which may more easily determine an identity of the object included within the ROI. Persons of ordinary skill in the art will recognize that bottle 4 may correspond to any object that is to be identified, or receive information for. For example, the object may be a product, such as an item of food or drink, a shape, a hand-held picture, and/or a device.

In some embodiments, camera 14 can be activated in connection with the issuance of audio response message 22. Camera 14 may then be configured such that it may determine that individual 2 is presenting a product whose identity is to be determined. In other instances, individual 2 may initiate the determination process by replying to audio response message 22, such as by uttering reply 24—"Here it is." Upon receiving reply 24 from individual 2, camera 14 can then acquire one or more images. Voice activated electronic device 10 can also respond politely to reply 24, for instance by generating another audio response message 26—"Thank you," however no response need be provided. In either case, image data representing the one or more images camera 14 obtains may be sent to backend system 100 for processing. In some embodiments, however, in response to providing audio response message 22, voice activated electronic device 10 may cause camera 14 to begin capturing the one or more images. For example, an instruction for camera 14 to capture an image one second after audio response message 22 is played may be generated such that camera 14 captures an image one second after audio response message 22 is output. In some embodiments, however, camera 14 may be instructed to capture one or more images in response to a user input. For example, in response to speaking command 20, or by pressing a button on electronic device 10, camera 14 may capture the one or more images. Persons of ordinary skill in the art Processing of the various captured images, as is described in more detail below, may correspond to taking the captured image(s) and automatically cropping the images in order to reduce or remove any unnecessary background information, as well any digital information related to an individual that may be holding an object to be identified. For example, processing may reduce or remove one or more of an individual's hands, arms, face, torso, or any other body part, or any combination thereof. Removing as many non-object artifacts from the captured image(s) may increase a likelihood that a positive determination of the object's identity will be made, and, furthermore, may increase the accuracy and reduce an amount of time needed to identify the object.

Figure 2:
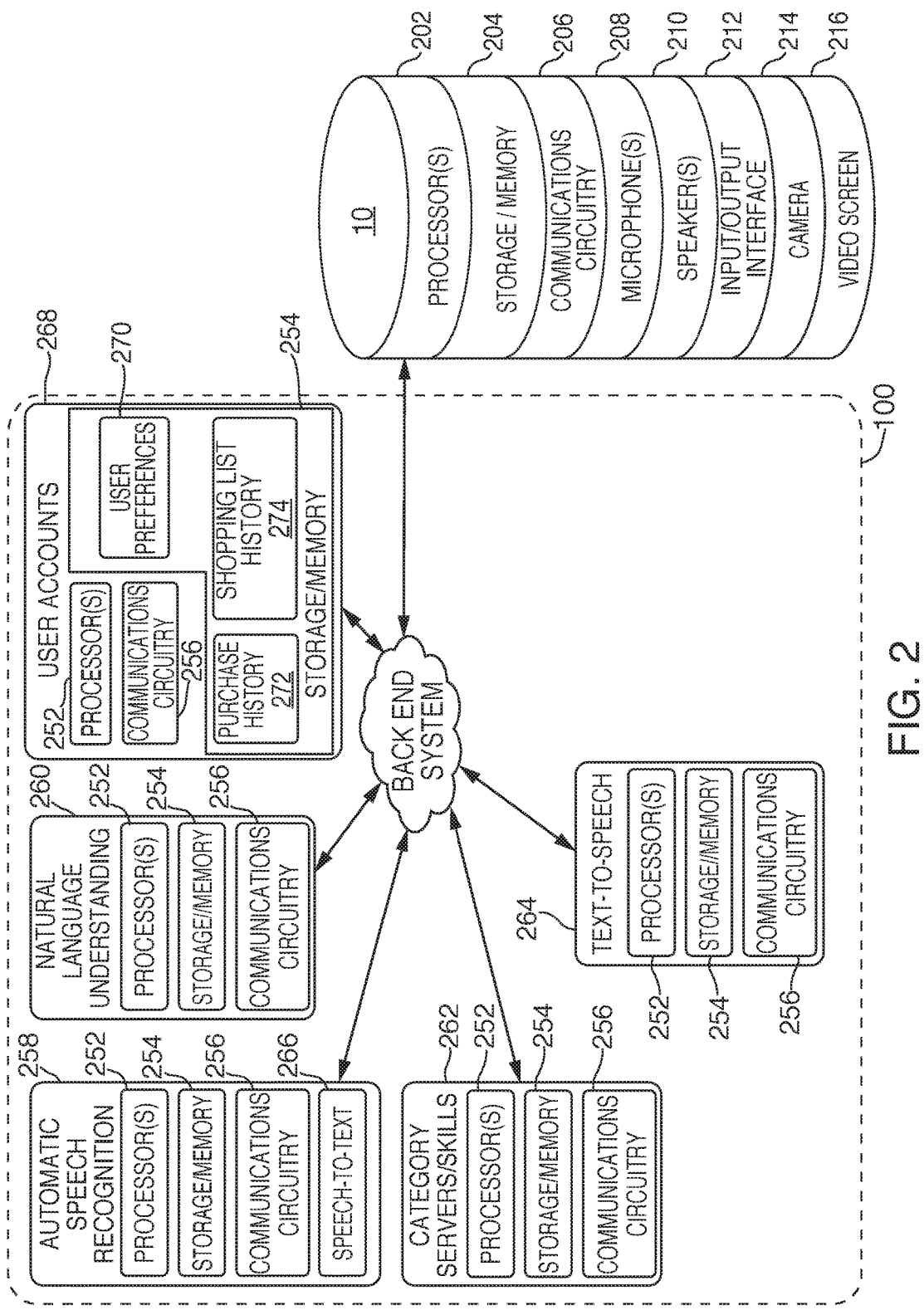
FIG. 2 is an illustrative diagram of the architecture of the system of FIG. 1, in accordance with various embodiments.

FIG. 2 is an illustrative diagram of the architecture of the system of FIG. 1, in accordance with various embodiments. Voice activated electronic device 10, in some embodiments, may correspond to any type of electronic device capable of being activated in response to detecting a specific sound. After detecting such a specific sound (e.g., a wakeword or trigger), voice activated electronic device 10 may recognize commands (e.g., audio commands, inputs) within captured audio, and may perform one or more actions in response to the received commands. In some embodiments, however, electronic device 10 may correspond to a manually activated device, such as a push-to-talk or tap-to-talk device. Such a manually activated electronic device may be activated in response to detecting a user input, such as a button being pressed, a screen being swiped or tapped, or any other manual user input, or any combination thereof. After detecting the manual user input, electronic device 10 may be capable of recognize commands within captured audio, and may perform one or more actions in response to the received commands.

Electronic device 10 may correspond to any suitable electronic device, including, but are not limited to, desktop computers, mobile computers (e.g., laptops, ultrabooks), mobile phones, smart phones, tablets, televisions, set top boxes, smart televisions, watches, bracelets, any other wearable device, display screens, personal digital assistants ("PDAs"), smart furniture, smart household devices, smart vehicles, smart transportation devices, and/or smart accessories. In some embodiments, voice activated electronic device 10 may be relatively simple or basic in structure such that no mechanical input option(s) (e.g., keyboard, mouse, trackpad) or touch input(s) (e.g., touchscreen, buttons) may be provided. For example, voice activated electronic device 10 may be able to receive and output audio, and may include power, processing capabilities, storage/memory capabilities, and communication capabilities.

Voice activated electronic device 10 may include a minimal number of input mechanisms, such as a power on/off switch, however primary functionality, in one exemplary embodiment, of voice activated electronic device 10 may solely be through audio input and audio output. For example, voice activated electronic device 10 may listen for a wakeword by continually monitoring local audio. In response to the wakeword being detected, voice activated electronic device 10 may establish a connection with backend system 100, send audio data to backend system 100, and await/receive a response from backend system 100. In some embodiments, however, non-voice activated devices, such as manually activated electronic devices, may also communicate with backend system 100 (e.g., push-to-talk devices). In response to detecting an user input, such as a button being pressed, manually activated electronic devices may also establish a connection with backend system 100, send audio data to backend system 100, and await/receive a response from backend system 100.

Voice activated electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212, camera 214 (shown as camera 14 in FIG. 1), and video screen 216 (shown as screen 12 in FIG. 1). However, one or more additional components may be included within voice activated electronic device 10, and/or one or more components may be omitted. For example, voice activated electronic device 10 may include a power supply or a bus connector. As another example, voice activated electronic device 10 may not include video screen 216. Furthermore, while multiple instances of one or more components may be included within voice activated electronic device 10, for simplicity only one of each component has been shown within FIG. 2. Still further, one or more components may be located external to voice activated electronic device 10. For example, camera 214 may be a separate component located external to voice activated electronic device 10, however camera 214 may be in communication with voice activated electronic device 10 such that captured images may be received thereby to be provided to backend system 100.

Processor(s) 202 may include any suitable processing circuitry capable of controlling operations and functionality of voice activated electronic device 10, as well as facilitating communications between various components within voice activated electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, processor(s) 202 may include its own local memory, which may store program modules, program data, and/or one or more operating systems. However, processor(s) 202 may run an operating system ("OS") for voice activated electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on voice activated electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tapes, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as a speech recognition module, a list of wakewords database, and/or a wakeword detection module. For example, the speech recognition module may include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to backend system 100 for processing.

The list of wakewords database may be a database stored locally on voice activated electronic device 10 that includes a list of a current wakeword or wakewords for voice activated electronic device 10, as well as one or more previously used, or alternative, wakewords for voice activated electronic device 10. In some embodiments, individual 2 may set or program a wakeword for voice activated electronic device 10. The wakeword may be programmed directly on voice activated electronic device 10, or a wakeword may be set by individual 2 via a backend system application resident on a user device that is in communication with backend system 100. For example, individual 20 may use their mobile device having the backend system application running thereon to set the wakeword for voice activated electronic device 10. The specific wakeword may then be communicated from their mobile device to backend system 100, which in turn may send/notify voice activated electronic device 10 of the individual's selection for the wakeword. The selected activation may then be stored within the list of wakeword database on storage/memory 204.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a likelihood result indicating a likelihood that the wakeword is represented within the audio signal detected by microphone(s) 208. The expression detector may then compare that likelihood result to a likelihood threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally, a portion of an audio signal is analyzed by comparing its MINI model to an HMM model of the trigger expression, yielding a feature result that represents the similarity of the audio signal model to the trigger expression model.

In practice, an MINI recognizer may produce multiple feature results, corresponding to different features of the MINI models. An expression detector may use a support vector machine ("SVM") classifier that receives the one or more feature results produced by the HMM recognizer. The SVM classifier produces a confidence mark indicating the likelihood that an audio signal contains the trigger expression. The confidence mark is compared to a confidence threshold to make a final decision regarding whether a particular portion of the audio signal represents an utterance of the trigger expression (e.g., wakeword). Upon declaring that the audio signal represents an utterance of the trigger expression, voice activated electronic device 10 may then begin transmitting the audio signal to backend system 100 for detecting and responds to subsequent utterances made by individual 2.

Communications circuitry 206 may include any circuitry allowing or enabling voice activated electronic device 10 to communicate with one or more devices, servers, and/or systems. For example, communications circuitry 206 may facilitate communications between voice activated electronic device 10 and backend system 100 using a network, such as the Internet, or using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between voice activated electronic device 10 and backend system 100. In some embodiments, voice activated electronic device 10 and backend system 100 may communicate with one another via a web browser using HTTP. Various additional communication protocols may be used to facilitate communications between voice activated electronic device 10 and backend system 100 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, voice activated electronic device 10 may include an antenna to facilitate wireless communications with a network using various wireless technologies (e.g., Wi-Fi, Bluetooth®, radiofrequency, etc.). In yet another embodiment, voice activated electronic device 10 may include one or more universal serial bus ("USB") ports, one or more Ethernet or broadband ports, and/or any other type of hardwire access port so that communications circuitry 206 allows voice activated electronic device 10 to communicate with one or more communications networks.

Voice activated electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, voice activated electronic device 10 may include multiple microphones (e.g., four, seven, ten, etc.) placed at various positions about voice activated electronic device 10 to monitor/capture any audio outputted in the environment where voice activated electronic device 10 is located. The various microphones 208 may include some microphones optimized for distant sounds, while some microphones may be optimized for sounds occurring within a close range of voice activated electronic device 10.

Voice activated electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where voice activated electronic device 10 may be located. In some embodiments, speaker(s) 210 may include headphones or ear buds, which may be wirelessly wired, or hard-wired, to voice activated electronic device 10, that may be capable of broadcasting audio directly to individual 2.

In some embodiments, one or more microphones 208 may serve as input devices to receive audio inputs, such as speech from individual 2. Voice activated electronic device 10, in the previously mentioned embodiment, may then also include one or more speakers 210 to output audible responses. In this manner, voice activated electronic device 10 may function solely through speech or audio, without the use or need for any input mechanisms or displays.

In one exemplary embodiment, voice activated electronic device 10 includes I/O interface 212. The input portion of I/O interface 212 may correspond to any suitable mechanism for receiving inputs from a user of voice activated electronic device 10. For example, a keyboard, mouse, joystick, or external controller may be used as an input mechanism for I/O interface 212. The output portion of I/O interface 212 may correspond to any suitable mechanism for generating outputs from voice activated electronic device 10. For example, one or more lights, light emitting diodes ("LEDs"), or other visual indicator(s) may be used to output signals via I/O interface 212 of voice activated electronic device 10. In some embodiments, one or more vibrating mechanisms or other haptic features may be included with I/O interface 212 to provide a haptic response to individual 2 from voice activated electronic device 10. Persons of ordinary skill in the art will recognize that, in some embodiments, one or more features of I/O interface 212 may be included in a purely voice activated version of electronic device 10. For example, one or more LED lights may be included on voice activated electronic device 10 such that, when microphone(s) 208 receive audio from individual 2, the one or more LED lights become illuminated signifying that audio has been received by voice activated electronic device 10.

Camera 214 may correspond to any suitable image or video capturing component. For example, camera 214 may be capable of capturing high definition images, low definition images, 3-D images, panoramic images, slow motion videos, stop motion videos, or any other type of video, or any combination thereof. Furthermore, camera 214 may be capable of capturing additional metadata with a captured image, such as a location of voice activated electronic device 10, a time that the image(s) or video(s) are captured, and/or a heat or other atmospheric condition of the local environment where voice activated electronic device is located, for example.

Video screen 216 may correspond to any suitable display screen capable of displaying content, such as images or videos, for voice activated electronic device 10. For example, video screen 216 may correspond to a touch screen, and video screen 216 may be any size and/or shape and may be located at any portion of voice activated electronic device 10. Various types of display screens that video screen 216 corresponds to may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

Backend system 100 may include various components and modules including, but not limited to, automatic speech recognition ("ASR") module 258, natural language understanding ("NLU") module 260, category servers/skills module 262, text-to-speech module 264, and user accounts module 268. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as a speaker identification ("ID") module, or any other module, or any combination thereof.

ASR module 258 may be configured such that it recognizes human speech in detected audio, such as audio captured by voice activated electronic device 10, which is then transmitted to backend system 100. ASR module 258 may include, in one embodiment, one or more processor(s) 252, storage/memory 254, and communications circuitry 256.

Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR module 258 may include speech-to-text ("STT") module 266, which may be configured to generate text data representing command 20 based on the received audio data representing command 200. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND® speech processing technologies available from the Autonomy Corporation, which is headquartered in Cambridge, England, United Kingdom.

ASR module 258 may include an expression detector that analyzes audio signals received by backend system 100. Such audio signals may, for instance, correspond to one or more words, or temporally related sounds, spoken by an individual, such as individual 2. For example, the spoken words may correspond to a question or command uttered by individual 2 (e.g., command 20). In some embodiments, ASR module 258 may also include an expression detector, which may be implemented using keyword spotting technology, as described in greater detail above.

NLU module 260 may be configured such that it determines user intent based on the text data. For example, NLU module 260 may receive text data representing command 20. NLU module 260 may determine that the intent of command 20 is to add an object to a household shopping list. In response to determining the intent of command 20, NLU module 260 may communicate the received text data to an appropriate category server or skill of category servers/skills module 262 to obtain response information and, in some embodiments, generate an appropriate response. NLU module 260 may include processor(s) 252, storage/memory 254, and communications circuitry 256 which, in one embodiment, are substantially similar to processor(s) 202, storage/memory 204, and communications circuitry 206 of electronic device 10, and the previous description may apply.

Category servers/skills module 262 may, in some embodiments, correspond to various action specific skills or category servers capable of processing various task specific actions. Category servers/skills module 262 may further correspond to one or more first party applications and/or third party applications capable of performing various tasks or actions, as well as providing response information for responses to user commands. For example, based on the context or user intent of the text data representing command 20, backend system 100 may access a particular category server or skill to obtain response information from, as well as, or alternatively, generate a response, which in turn may be communicated back to electronic device 10. For example, in response to determining that the user intent of command 20 is a request that ketchup be added to a household shopping list (stored, for example, within shopping list history module 274), user account module 268 can be accessed to obtain the shopping list for individual 2, which can be updated if the object is identified. Category servers/skills module 262 may also include one or more instances of processor(s) 252, storage/memory 254, and communications circuitry 256, which may be substantially similar to processor(s) 252, storage/memory 254, and communications circuitry 256 of ASR module 258, and the previous descriptions may apply.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. TTS module 264 may also include processor(s) 252, storage/memory 254, and communications circuitry 256, which in one embodiment may be substantially similar to processor(s) 252, storage/memory 254, and communications circuitry 256 of ASR module 258, and the previous descriptions may apply. For example, TTS module 264 can prepare and produce an audio file corresponding to response 22 of FIG. 1, which can then be sent to electronic device 10 via connection 18.

In some embodiments, category servers/skills module 262 may further generate response information, such as responsive audio data representing audio response message 22 or audio response message 26. Alternately, category servers/skills module 262 may send device 10 a command to activate camera 14, with instructions on how many images to obtain and the timing of obtaining them. Category servers/skills module 262 may then convert the text data to speech using TTS module 264 in order to generate responsive audio data 14 representing a response message, or to provide individual 2 with further instructions, if necessary.

User accounts module 268 may store one or more user profiles corresponding to individuals having a registered account on backend system 100. For example, a parent may have a registered account on backend system 100, and each of the parent's children may have their own user profile registered under the parent's registered account. Information, settings, and/or preferences, for example, for each user profile may be stored within user accounts module 268. In some embodiments, user accounts module 268 may store a voice signal for a specific user profile. This may allow speaker identification techniques to be used to match a voice to voice biometric data associated with a specific user profile. In some embodiments, user accounts module 268 may store a telephone number assigned to a particular user profile. When the assigned telephone number for a user profile is called, one or more actions may be performed by backend system 100, such as answering the call and providing one or more questions to be answered. The voice biometric data, telephone number, or any other user preference may, in some embodiments, be stored within a user preferences component 270 of storage/memory 254 of user accounts module 268. In some embodiments, one or more preferred products (e.g., food that an individual having a register user account on user accounts module 268 prefers), languages, dialects, or accents may also be stored within user preferences component 270. User accounts module 268 may also include purchase history module 272, which can be utilized to aid backend system 100 in determining the object being displayed by individual 2 within one or more captured images. For example, after image data representing an initial image has been received by backend system 100 from voice activated electronic device 10, the initial image may be cropped, and an analysis of an identity of the object may begin. Purchase information stored in purchase history module 272, such as images of purchased goods, may be used to provide additional data for the object identification analysis.

For example, the analysis may start by reviewing products already purchased by individual 2 prior to advancing to items that have never been purchased. Similarly, the analysis may begin by accessing shopping list history module 274 to determine one or more items that were previously added to the family shopping list.

In response to generating a response to a question (such as audio response message 22), for example, TTS module 264 may access user preferences component 270 of user accounts module 268 to determine a pronunciation or accent to use for words within a response to be generated. User accounts module 268 may also include processor(s) 252 and communications circuitry 256, in addition to storage/memory 254, which in some embodiments are substantially similar to processor(s) 252 and communications circuitry 256 of ASR module 258, and the previous description may apply.

Persons of ordinary skill in the art will recognize that although each of ASR module 258, NLU module 260, category servers/skills module 262, TTS module 264, and user accounts module 268 may each include instances of processor(s) 252, storage/memory 254, and communications circuitry 256, and those instances of processor(s) 252, storage/memory 254, and communications circuitry 256 within each of ASR module 258, NLU module 260, skills module 262, TTS module 264, and user accounts module 268 may differ. For example, the structure, functionality, and style of processor(s) 252 within ASR module 258 may be substantially similar to the structure, functionality, and style of processor(s) 252 within NLU module 260, however the actual processor(s) 252 need not be the same component.

Figure 3:
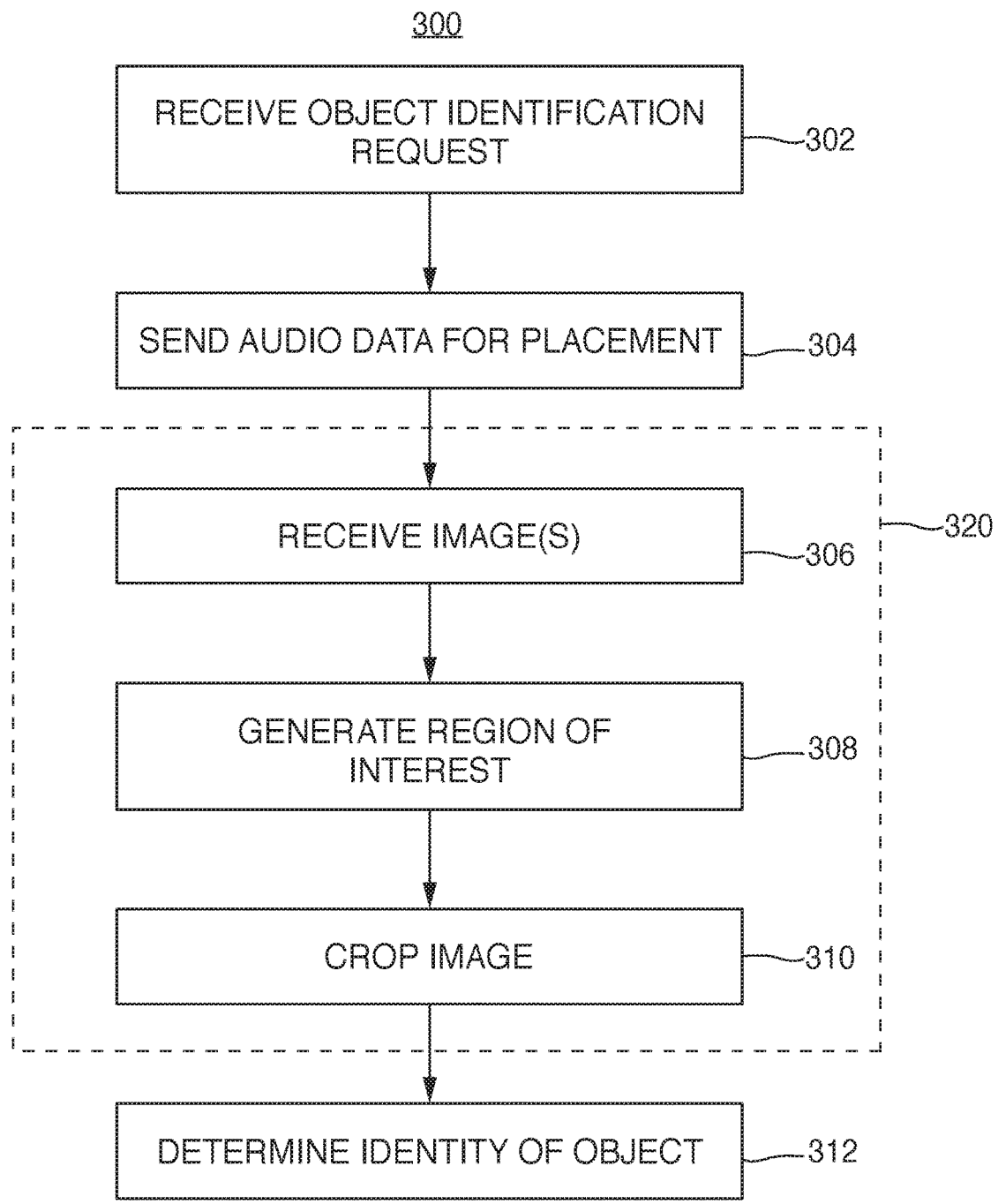
FIG. 3 is an illustrative flowchart of a process for identifying an object in response to receive a request, in accordance with various embodiments.

FIG. 3 is an illustrative flowchart of a process for identifying an object in response to receive a request, in accordance with various embodiments. Process 300 may begin at step 302. At step 302, a request for to identify an object may be received by backend system 100 from an electronic device, such as voice activated electronic device 10. As shown in FIG. 1, individual 2 may speak command 20 to voice activated electronic device 10, where command 20 includes an utterance of a wakeword subsequently followed by a question. Command 20 may be recorded by voice activated electronic device 10, for instance using microphone(s) 208, and converted to digital audio data that to be sent to backend system 100. As described above, command 20 may be processed by ASR module 258 to convert the digital audio data into text data representing command 20, and the text data may then be provided to NLU module 260 in order to determine a user intent of command 20. In the illustrative, non-limiting embodiment of FIG. 1, NLU module 260 may determine that command 20 is related to a product that individual 20 is requesting a resupply of. In this particular scenario, a quantity for re-supply may already be determined or known based on a previous purchase or purchases by individual 2, which may be in a user profile of individual 2 within user accounts module 268. After NLU module 260 determines that command 20 is to replenish a product, category server/skills module 262 may be accessed, which initiates the process of creating of responsive audio data to send back to voice activated electronic device 10 to indicate to individual 2 to place the product in front of camera 14 at step 304. In some embodiments, category servers/skills module 262 may generate responsive text data, which is then provided to TTS module 264 to generate the responsive audio data representing the responsive text data. Backend system 100 may, therefore, send the responsive audio data to voice activated electronic device 10 as described above in step 304.

FIG. 3 shows a "generic" representation of the embodiments disclosed herein, where one or more images are received from electronic device 10 at step 306, one or more regions of interest ("ROI") are determined at step 308, and the one or more images are cropped in step 310. Accordingly, steps 306, 308, and 310, in some embodiments, may be grouped together within dashed arrangement 320. Specific details of various exemplary embodiments of corresponding to steps 306, 308, and 310 (and/or any additional steps) included within dashed arrangement 320 are described in more detail below in connection with FIGS. 4-10. Each of those embodiments (and in some instances multiple embodiments), are provided below for purposes of illustration and not limitation, and each embodiment ends with the determination of the object's identity in question at step 312 based on a cropped version of an original image or original images, which itself may be based on the determined ROI.

Figure 4:
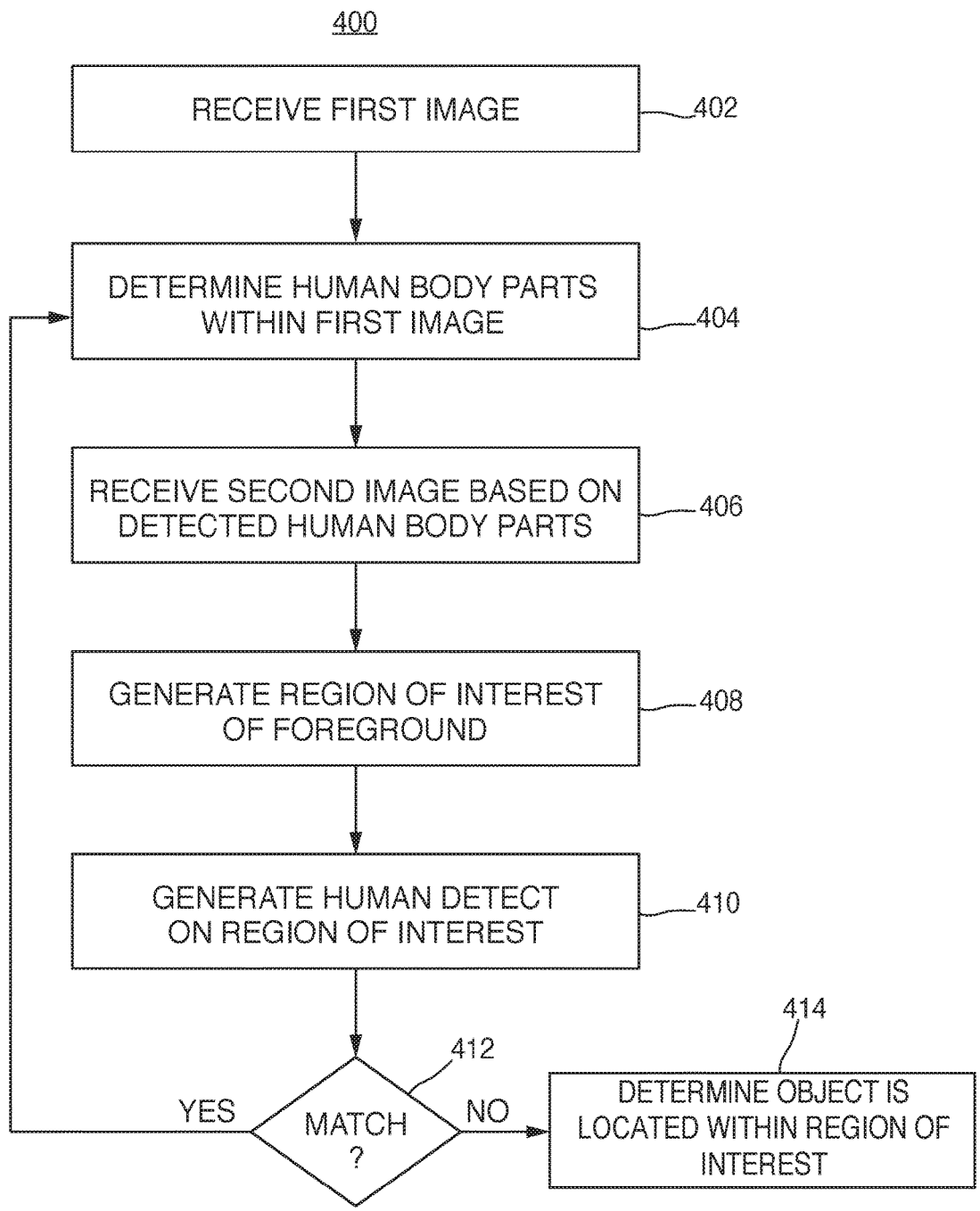
FIG. 4 is an illustrative flowchart a process of performing a focus sweep, in accordance with various embodiments.

FIG. 4 is an illustrative flowchart a process of performing a focus sweep, in accordance with various embodiments. A focus sweep, as described herein, corresponds to a process that detects one or more parts of a human body within an image. Process 400 (which, as described above, may correspond to some or all of the steps included within dashed arrangement 320) may begin at step 402, where first image data representing a first image may be received by backend system 100 from voice activated electronic device 10. The received image data may then be processed at step 404 in order to detect one or more human body parts within the first image. Furthermore, a location of any identified human body parts may be determined at step 404. In some embodiments, category server/skills modules 262 may include one or more techniques or processes for identifying the various human body parts and the location thereof via one or more first party skills and/or third party skills. The human body part(s) determination can be accomplished through known machine learning techniques (where statistical reasoning is applied to approximate the desired results), such as least squares analysis, or the use of generative and discriminative supervised learning modules. In many of these instances, the system is trained using known images, which can be divided into patches. Features can be extracted from the patches, which can then be used to form a dictionary to compare future results to.

After the one or more human body parts have been detected at step 404, backend system 100 may cause at least one additional image to be obtained based on a location of the human body part(s) at step 406. For example, a second image may be requested to be captured by electronic device 10 from backend system 100, where the second image is to be based on a different field-of-view plane than that which the first image was obtained. In response to capturing the second image, electronic device 10 may send second image data representing the second image to backend system 100. Although only two images are captured in the exemplary embodiment of process 400, persons of ordinary skill in the art will recognize that any number of images may be captured. However, in some embodiments, use of only two images may reduce due to the potential latencies that can be introduced with each additional image to process. For example, the human body parts may be detected at a given plane, and two additional images, each successively closer to the foreground may be obtained.

At step 408, a region of interest ("ROI") may be generated based on a determined foreground of the second image. The image may then be cropped (similar to step 310 of FIG. 3), or further processing may be limited to a size of the ROI within the second image. At step 410, a determination of whether or not an additional human body part, or parts, is located within the reduced size ROI of the second image may occur.

At step 412, a determination of the results of the human body part detection of the second image are compared with the results of the human body detection of the first image. For example, a difference between a coloration of each pixel within the first and second image may be determined to identify if the first and second images include substantially similar content. If a match occurs, that may signifies that the human body parts identified in the first image have not yet been removed from the second image, and process 400 may return to step 404. If, however, a match is determined to be present at step 412, then process 400 may proceed to step 414, where a determination may be made that an object is included within the ROI. Furthermore, at step 414 an identity of the object that was held up in front of camera 14 by individual 2 of FIG. 1 may occur (e.g., to determine that object 4 is a bottle of ketchup). Persons of ordinary skill in the art will appreciate that the cropping step previously described may occur after each ROI is generated (e.g., step 408), or it may occur prior to the determining that the object is located within the ROI at step 414, however in one embodiment such cropping need not occur.

Figure 5:
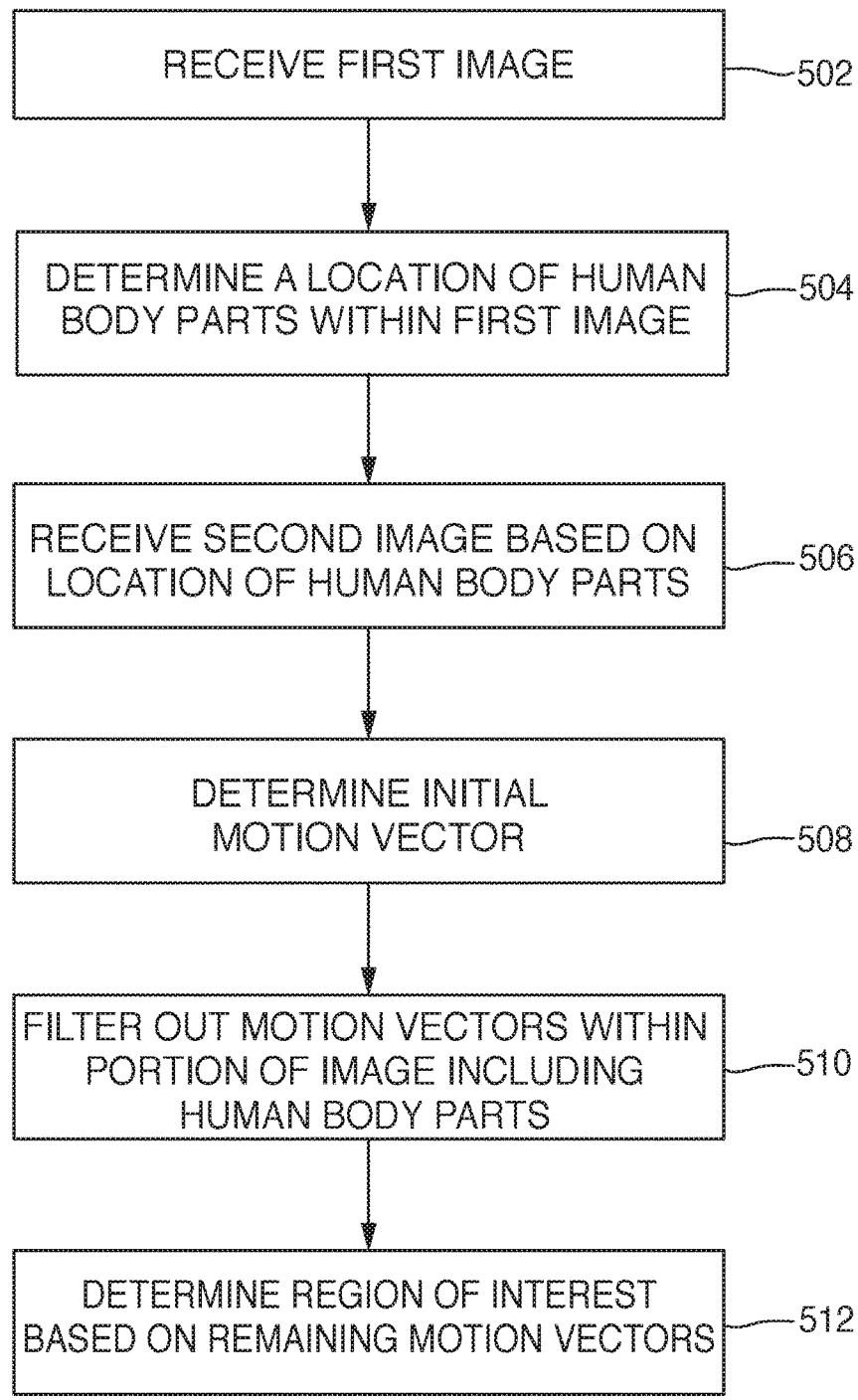
FIG. 5 is an illustrative flowchart of a process in which human body parts are determined within images based motion vectors, in accordance with various embodiments.

FIG. 5 is an illustrative flowchart of a process in which human body parts are determined within images based motion vectors, in accordance with various embodiments. Process 500, in one embodiment, may begin at step 502, where a first image may be received. For example, first image data representing the first image may be provided from electronic device 10 to backend system 100 using one or more of the aforementioned communications protocols. At step 504, a human body part detection (using machine learning techniques as previously described) process may determine a location of one or more human body parts within the received first image.

At step 506, a second image may be received by backend system 100 from electronic device 10. In some embodiments, second image data representing the second image may be provided to backend system 100. The second image may, for example, be focused on a different location within a depth-view of camera 14 based on the determined location of the one or more human body parts determined to be present within the first image.

At step 508, an initial motion vector, or initial motion vectors may be determined based on the first and second images. The initial motion vectors may be determined, for example, by analyzing pixel flow between the images. For instance, at first location within the first image may have a first pixel density (e.g., color or colors, intensity, etc.), and the same location within the second location may have a second pixel density. Depending on the difference between the first pixel density and the second pixel density, a mapping of the differences between the first and second images may be determined. By analyzing each location of both the first image and the second image, an overall difference between the two images may be determined, which may be represented by the motion vectors.

At step 510, the initial motion vectors that can be attributed to a portion of the images including human body parts may be filtered out. As mentioned above, the second image may correspond to an image representative of the foreground. Therefore, by filtering out portions of the human body parts within the second image, a determination of an object to be identified within the second image may occur. For example, by filtering out any remaining portions of the second image that correspond to a human body part, such as a hand, an object (e.g., ketchup bottle) may be more easily recognized within the second image.

At step 512, a region of interest may be determined based on the remaining initial motion vectors. This may be used, for instance, to assist in cropping a portion of the second image to "highlight" the object to be identified. After the cropping of the second image encompassing the object occurs, an attempt to determine an identity of the object may can occur, for example by returning to step 312 of FIG. 3.

Figure 6:
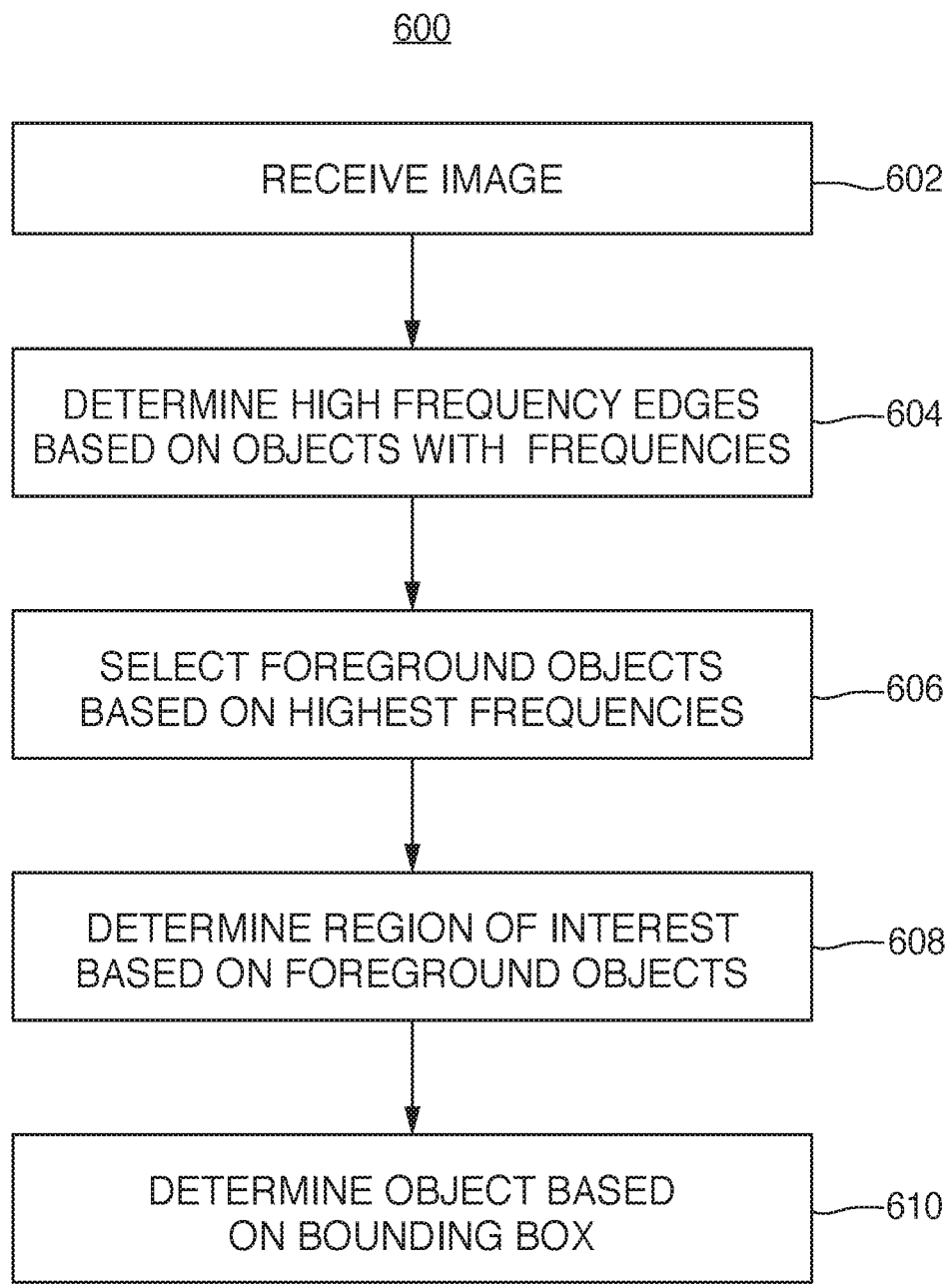
FIG. 6 shows an illustrative flowchart of a process using of high frequency edge detection to assist in determining an identity of an object, in accordance with various embodiments.

FIG. 6 shows an illustrative flowchart of a process using of high frequency edge detection to assist in determining an identity of an object, in accordance with various embodiments. Process 600 may begin at step 602, where an image may be received. For example, backend system 100 may receive image data representing an image captured by an electronic device, such as electronic device 10.

At step 604, the received image may be analyzed to determine one or more high frequency edges within the image. For example, an intensity function of the image may be determined, and derivatives of the intensity function may be determined. Values of the derivatives of the intensity function at various points within the image may indicate edges of objects within the image. By determining the edges of objects within the image, a shape of the objects within the boundaries of the image may be more easily, and quickly, determined. As one illustrative example, a Sobel-Feldman operator may be applied to the received image to determine a gradient of each point of the image. Portions of the image having a high gradient value may be highlighted, and the various highlights may represent a generalized outline of objects included within the image. The detectible edges can result from discontinuity in a surface of an object, from a depth of an object (the farther away the object stretches, the more blurred it's edges become), surface color discontinuities, and illumination discontinuities caused by uneven lighting.

After the edges have been determined, foreground objects may be selected at step 606. The foreground objects, in one exemplary embodiment, may correspond to objects that are determined to be closer the foreground, or in other words closer to camera 14 of electronic device 10, based on those objects having the highest frequencies. Then, at step 608, a region of interest may be determined such that the foreground objects are included therein. After the region of interest has been generated, image cropping, such as the image cropping described in relation to step 310 of FIG. 3 may occur. However, in some embodiments, no additional image cropping need be performed, and the aforementioned is merely exemplary.

At step 610, a determination of the object, such as determining a portion or portions of the region of interest that correspond to the object, may occur. Based on the portions of the region of interest of the image that include the object, an identity of the object may be determined next. For example, process 600 may proceed to step 312 of FIG. 3 such that the identity of the object within the received image may be determined. By using only the portion of the object within the region of interest, a more accurate and faster identification of the object therein may occur.

Figure 7:
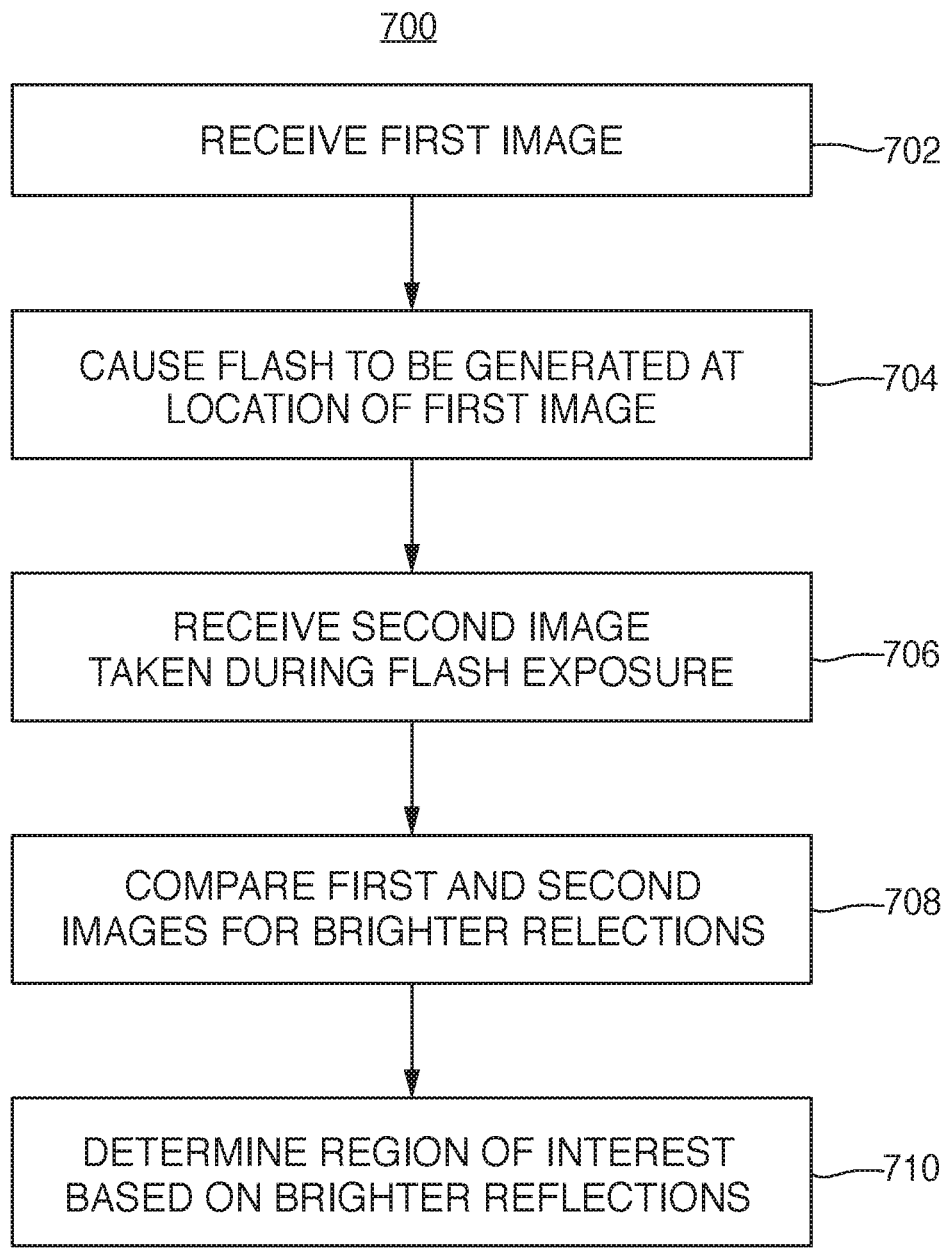
FIG. 7 is an illustrative flowchart of a process that uses flash exposure to assist in determining an identity of an object, in accordance with various embodiments.

FIG. 7 is an illustrative flowchart of a process that uses flash exposure to assist in determining an identity of an object, in accordance with various embodiments. Process 700 may begin at step 702 where a first image may be received by backend system 100. For example, backend system 100 may receive first image data representing a first image captured by camera 14 of electronic device 10.

At step 704, backend system 100 may generate an instruction that causes electronic device 10 to generate a flash (e.g., a pulse of light) from camera 14, or any other light source (e.g., LED) associated with camera 14. Persons of ordinary skill in the art will recognize that any suitable flash may be employed, and the aforementioned is merely exemplary. Backend system 100 may then provide the instruction to electronic device 100, such that the flash is generated in an area proximate to where the first image was. The flash can be produced in a number of different ways, some of which may disturb individual 2, and others in which individual 2 may not even know a flash was output by electronic device 10. For example, an infrared flash can be used, which will not be detectible by individual 2. Alternatively, screen 12 may be brightly illuminated to act as a flash (which will likely very detectible by individual 2). Backend system 100 also generate another instruction that is provided to electronic device 10 to obtain another image while the flash is exposed. In response to receiving the instruction, electronic device 10 may cause camera 14 to capture another image while the flash is being output.

At step 706, second image data representing the second image (e.g., the image captured during the flash) may be received by backend system 100. Both the first image and the second image may correspond to approximately a same location (e.g., a similar view of camera 14), however one image, the second image, is taken with a flash while the other image, the first image, is taken without the flash. A comparison may be made by backend system 100 (e.g., using one or more category servers/skills of category server/skills module 262), at step 708, to determine the areas within the second image that have brighter reflections. For example, objects that are closer to camera 14 may reflect more light from the flash than objects that are located further away from camera 14. Therefore, portions of the second image that correspond to objects that are closer to camera 14 have a higher intensity of light than portions of the image corresponding to objects that are further away.

Based on the portions of the second image that have a higher reflection of light associated therewith, a region of interest corresponding to those objects may be determined at step 710. For instance, objects that are closer to camera 14 will reflect more light from the flash. Therefore, these objects are most likely in the foreground, and therefore the region of interest may be generated to include those portions of the first image having the brighter reflections. An identify of an object located within the region of interest may then be determined, for example, using step 312 of FIG. 3.

Figure 8:
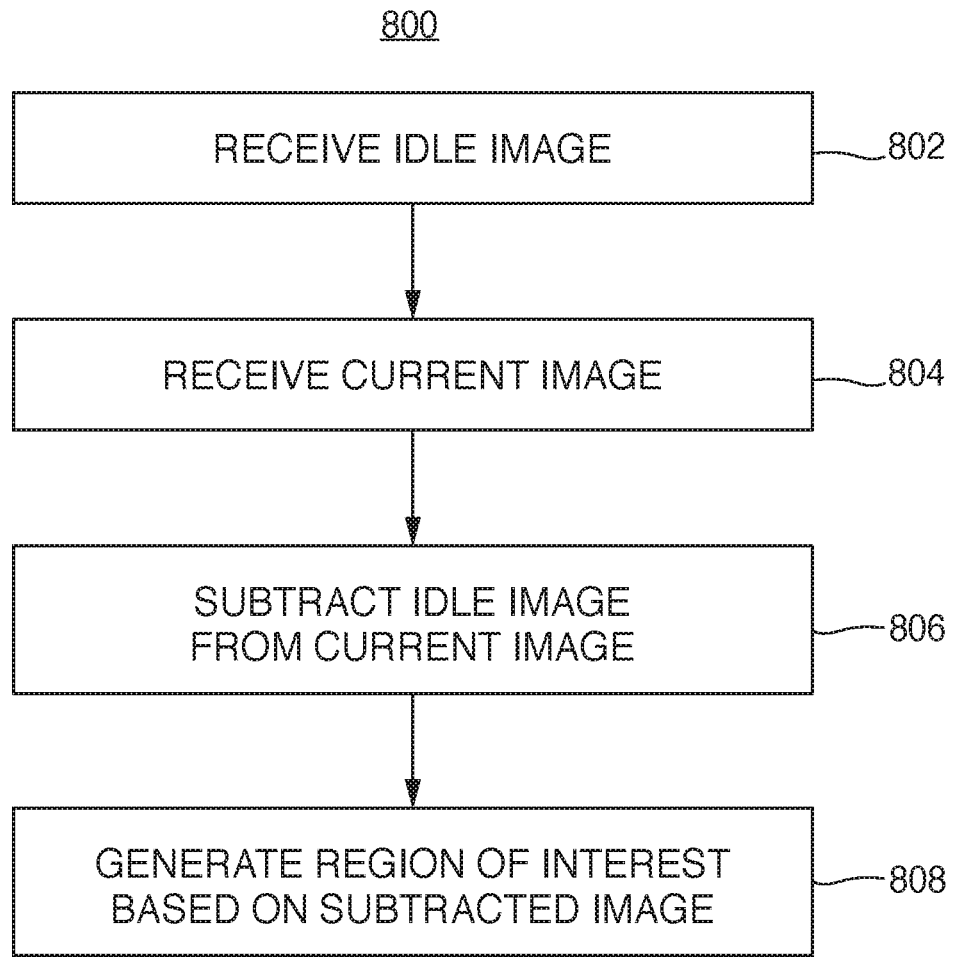
FIG. 8 is an illustrative flowchart of a process using idle images for comparisons with current images to assist in identification of an object, in accordance with various embodiments.

FIG. 8 is an illustrative flowchart of a process using idle images for comparisons with current images to assist in identification of an object, in accordance with various embodiments. Process 800 may begin at step 802. At step 802, image data representing one or more images captured by camera 14 of electronic device 10 during an idle or sleep state may be received. In some embodiments, these images may correspond to situations where the local environment where electronic device 10 is located is also idle. For example, the one or more idle images may be captured in response to determining that no interaction with electronic device 10 have occurred within given period of time, such as 4 hours. As another example, the one or more idle images may be captured during a pre-set time, such as during overnight or early in the morning. In some embodiments, in response to capturing the one or more idle images, electronic device 10 may send image data representing the idle images to backend system 100, which may store those images within storage/memory 254 of user accounts module 268.

At step 804, current image data representing a current image may be received by backend system 100 from electronic device 10. The current image may, for instance, be captured by camera 14 of electronic device 10 in response to individual 2 providing an input (e.g., a voice command or a manual input) of a request that causes electronic device 10 to take a current image.

After the current image data representing the current image has been received by backend system 100, the stored idle image may be subtracted from the current image at step 806. For example, a difference in a pixel density, motion vectors, gradients, or any other suitable criteria may be employed to determine a difference between the current image and an idle image. By determining the difference between the two images, an object that is present within the current image, as well as one or more human body parts, may be more easily identified as any background imagery may be removed.

At step 808, a region of interest corresponding to a portion of the current image including the object may be determined based on the result of the image subtraction. The region of interest may then be used to further crop the image to more clearly reveal portions of the current image that include the object. After cropping, a determination of an identity of the object included within the current image may occur, for instance, using step 312 of FIG. 3.

Figure 9:
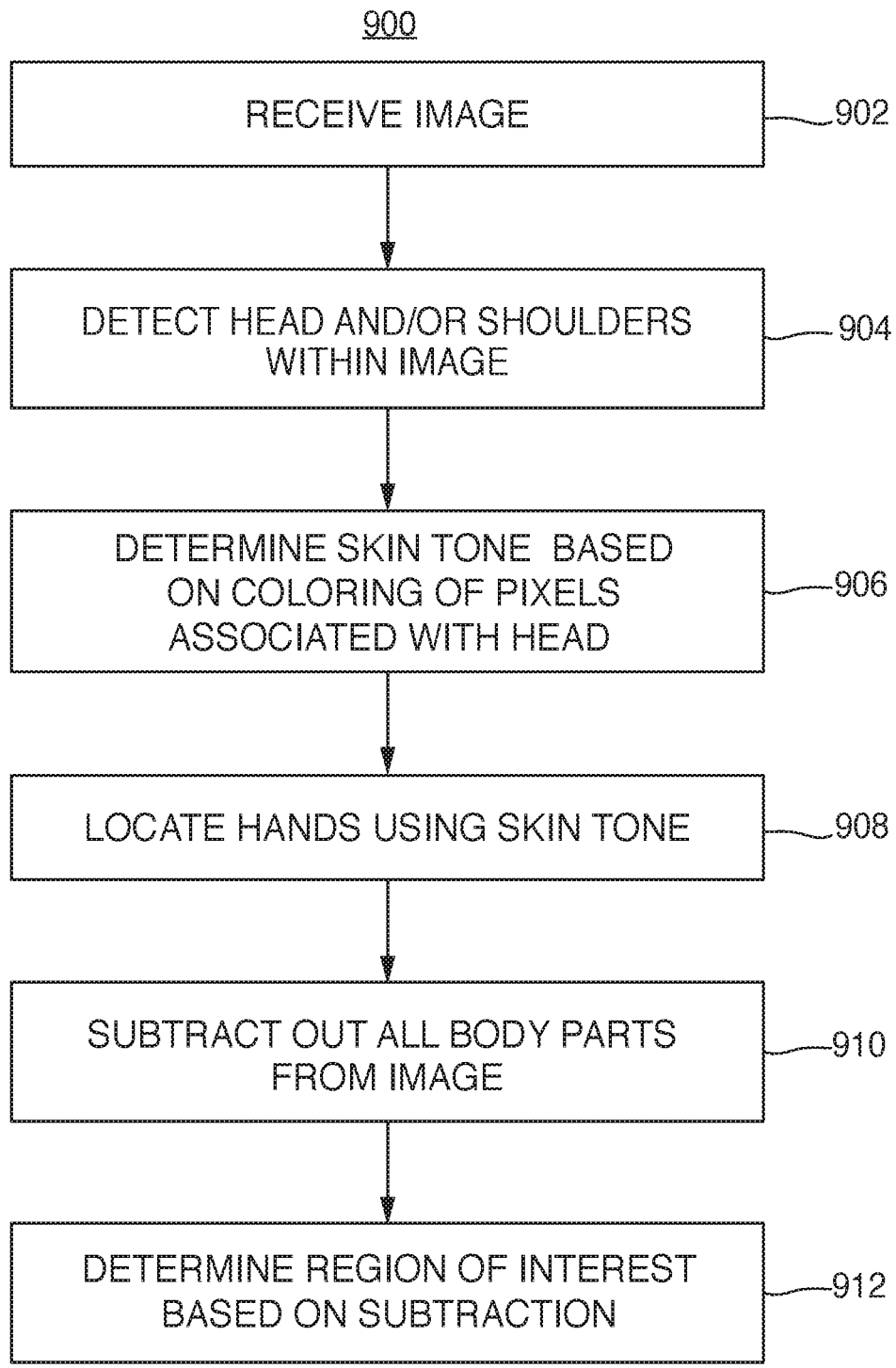
FIG. 9 is an illustrative flowchart of a process using detection of a skin tone of a human body part to assist in identification of an object, in accordance with various embodiments.

FIG. 9 is an illustrative flowchart of a process using detection of a skin tone of a human body part to assist in identification of an object, in accordance with various embodiments. Process 900 may begin at step 902, where an image may be received by backend system 100 from electrical device 10. Step 902, in one embodiment, may be substantially similar to step 802 of FIG. 8, and the previous description may apply.

At step 904, a human head and/or shoulder may be identified within the received image. As previously described, machine learning techniques may be used to determine the location of a human head and/or shoulders. Persons of ordinary skill in the art will recognize that any suitable human body part recognition technique may be employed to identify one or more portions of a human body, such as a torso, a head, and/or a shoulder, for example.

At step 906, a skin tone, such as a color or hue, of the identified human body part may be determined. For example, after determining a portion of the image corresponding to a human head, a color of the human head may be determined. The determined color, may therefore, correspond to a skin tone of the individual's head within the image. At step 908, a hand or hands of the individual within the image may be located based on the determined skin tone of the head. Based on the determined skin tone, an additional analysis of the image may be performed to locate other, perhaps smaller, body parts, such hands and/or fingers. For example, after determining the skin tone of the human head, another portion of the image may be determined to include five smaller portions having the same coloring as the skin tone. These five smaller portions, may therefore, be determined to be fingers. As another example, a portion of the image located at a certain distance away from the head may be determined to be of the same coloring as the skin tone, and this portion of the image may be determined to correspond to a hand. In some embodiments, it may also be determined that proximate to the portion determined to be the hand or fingers, there may be a different coloring, and therefore, that portion may corresponding to an object being held in the hand, or by the fingers, within the image.

After those additional human body parts, such as hands or fingers have been identified, all body parts may be subtracted from the received image at step 910. By subtracting out all of the identified body parts, final image may be generate that includes minimal amount of human body parts. Then, at step 912, a region of interest including the object may be determined using the results of the subtraction operation. For example, the portions of the final image should have no more human body parts therein, and thus the object to be identified should remain. The region of interest may then crop the portion of the final image including the object. Furthermore, after the region of interest is determined, process 900 may proceed to step 312 of FIG. 3 where an identity of the object may occur.

Figure 10:
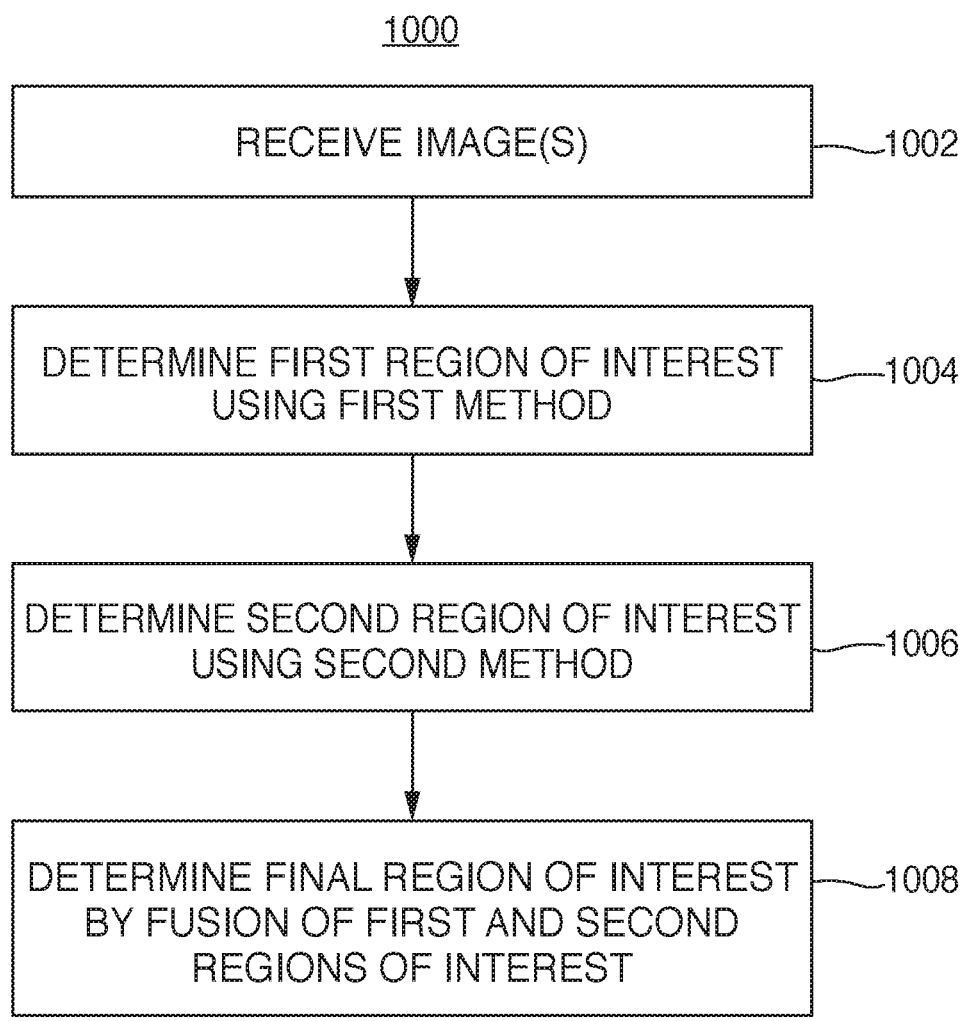
FIG. 10 is an illustrative flowchart of a process combining two or more techniques for determining a region of interest to determine a final region of interest to be used in assisting in an identification of an object within an image, in accordance with various embodiments.

FIG. 10 is an illustrative flowchart of a process combining two or more techniques for determining a region of interest to determine a final region of interest to be used in assisting in an identification of an object within an image, in accordance with various embodiments. Two or more regions of interest may be determined using any of the aforementioned processes (e.g., processes 400-900), and the two regions of interest may be fused to produce a final region. The fusion can be an aggregation of various regions of interest. For example, the final region of interest may be two or more regions of interest added together, and then an average taken, or the final region of interest may be determined using all of minimum values, or the maximum values. As an illustrative example, aligning all of the regions of interest on their center-points and taking a center-weighted average may be one technique for determining the final region of interest.

Process 1000 may begin at step 1002, where one or more images are received by backend system 100. Step 1002, in some embodiments, may be substantially similar to step 902 of FIG. 9, and the previous description may apply. At step 1004, a first region of interest may be determined using any of the aforementioned techniques described in FIGS. 4-9, while a second region of interest may also be generated at step 1006 using a same, or different technique as that of the first region of interest. For example, one implementation of process 1000 may include a first region of interest determined generated using the focus sweep technique, a second region of interest determined using the high frequency edge technique, a third region of interest determined using the flash/no-flash technique, and a fourth region of interest determined using the motion vectors technique previous described.

At step 1008, a final region of interest may be determined by fusion of the first and second regions of interest. The fusion of the regions of interest may be accomplished in a variety of manners, such as simply adding them together and taking the average, or taking a center-weighted average, or utilizing the minimums for each of the four bounding boxes, etc. Furthermore, in one embodiment, the fusion may be accomplished by applying a confidence score to each region of interest that has been determined, and selecting the region of interest with the highest, or largest, confidence score to be the final region of interest. After the final region of interest is determined, process 1000 may proceed to step 312 of FIG. 3 where an identity of an object within the received image(s) may be determined.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific feature are disclosed as illustrative forms of implementing the claims.

What is claimed is:

1. A method for identifying objects, comprising:
receiving, from an electronic device, first image data representing a first image including an individual holding an object in a hand of the individual;
identifying a head of a human body of the individual represented in the first image;
determining a skin tone of the head;
identifying the hand represented within the first image by determining a portion of the first image that includes five similarly sized blocks have a color that is the skin tone;
generating a new version of the first image by subtracting the portion from the first image;
determining a region of interest associated with a location of the new version that is associated an area including the portion;
generating a cropped image by cropping the new version of the image to include the region of interest;
determining an identity of the object by:
   determining a similarity value of the object located within the region of interest and a reference item stored within an object database; and
   determining that the similarity value is greater than a similarity threshold for the object;
receiving responsive text data representing a name of the object and a message;
generating responsive audio data representing the responsive text data by executing text-to-speech functionality; and
sending the responsive audio data to the electronic device.

2. The method of claim 1, further comprising:
receiving audio data representing a question regarding an identity of the object;
generating text data representing the question by executing speech-to-text functionality to the audio data;
determining, based on the question, that a camera of the electronic device is needed to capture an image;
generating an instruction to cause a camera of the electronic device to capture the first image data; and
sending the instruction to the electronic device.

3. The method of claim 1, further comprising:
receiving audio data representing a question regarding an identity of the object;
determining, based on the question, that a flash of a camera of the electronic device is needed to determine an amount of light reflecting off the object and the hand;
generating a first instruction to cause the electronic device to output a flash of light using the flash of the camera;
generating a second instruction that causes the camera to capture a new image as the flash of light is output;
sending the first instruction and the second instruction to the electronic device;
receiving new image data representing the new image;
determining a new portion of the new image that has a brightness value greater than a brightness threshold;

determining that the new portion corresponds to a foreground of the new image;
determining a new region of interest representing the new portion; and
generating a final region of interest by averaging the new region of interest and the region of interest such that the final region of interest is used for the cropped image.

4. The method of claim 1, further comprising:
receiving, from the electronic device, second image data representing a second image focused on the region of interest;
determining that there is text included within the region of interest;
providing the text to a text detector;
determining, using the text detector, that the text represents a word; and
using the text to determine the identity by determining reference items stored within the object database that also include the word.

5. A method, comprising:
receiving audio data representing speech from an electronic device;
determining that at least one image is to be captured;
generating an instruction to cause the electronic device to capture a first image;
sending the instruction to the electronic device;
receiving, from the electronic device, first image data representing the first image;
identifying a first human body part within the first image;
determining a first location of the first human body part within the first image;
determining a first region of interest within the first image such that the first region of interest is offset from the first location;
determining an identity of an object within the first image; and
sending information associated with the identity to the electronic device.

6. The method of claim 5, wherein identifying the first human body part comprises:
identifying a head of an individual within the first image;
determining a first location within the first image associated with the head; and
determining a second location associated with a hand of the individual based on a distance between the first location and the second location.

7. The method of claim 5, further comprising:
identifying a head of an individual within the first image;
determining a color of the head;
determining a plurality of portions within the first image that are also the color;
determining the plurality of portions correspond to a hand of the individual;
subtracting the plurality of portions from the first image; and
determining that the object is located within the first region of interest.

8. The method of claim 5, further comprising:
determining a first confidence score for the first region of interest;
receiving second image data representing a second image;
identifying the first human body part within the second image;
determining a second region of interest within the second image;
determining a second confidence score for the second region of interest;
determining that the first confidence score is greater than the second confidence score; and
selecting the first region of interest for determining the identity.

9. The method of claim 5, wherein determining the identity of the object comprises:
generating a new version of the first image comprising the first region of interest;
sending the new version to an object database;
determining that a similarity value between a shape of an item and the object is greater than a similarity threshold; and
accessing the information associated with the object from the object database.

10. The method of claim 5, further comprising:
receiving second image data representing a second image;
determining at least one motion vector by comparing the first image and the second image; and
determining the first location based on the at least one motion vector.

11. The method of claim 5, further comprising:
receiving second image data representing a second image;
determining a brightness of portions of the second image;
determining a brightness difference between the portions and sections of the first image; and
determining the first location based on at least one bright portion of the second image that has a brightness difference greater than a brightness threshold.

12. A system, comprising:
communications circuitry configured to receive first image data representing a first image taken by an image capturing component of an electronic device;
memory; and
at least one processor operable to:
 receive audio data representing speech from the electronic device prior to receiving the first image data;
 determine that at least one image is to be captured;
 generate an instruction to cause the electronic device to capture the first image;
 send the instruction to the electronic device;
 identify a first human body part within the first image;
 determine a first location of the first human body part within the first image;
 determine a first region of interest within the first image such that the first region of interest is offset from the first location;
 determine an identity of an object within the first image; and
 send information associated with the identity to the electronic device.

13. The system of claim 12, wherein the at least one processor is further operable to:
identify a head of an individual within the first image;
determine a first location within the first image associated with the head; and
determine a second location associated with a hand of the individual based on a distance between the first location and the second location.

14. The system of claim 12, wherein the at least one processor is further operable to:
identify a head of an individual within the first image;
determine a color of the head;
determine a plurality of portions within the first image that are also the color;
determine the plurality of portions correspond to a hand of the individual;
subtract the plurality of portions from the first image; and determine that the object is located within the first region of interest.

15. The system of claim 12, wherein the at least one processor is further operable to:
   determine a first confidence score for the first region of interest;
   receive second image data representing a second image;
   identify the first human body part within the second image;
   determine a second region of interest within the second image;
   determine a second confidence score for the second region of interest;
   determine that the first confidence score is greater than the second confidence score; and
   select the first region of interest for determining the identity.

16. The system of claim 12, wherein the at least one processor is further operable to:
   generate a new version of the first image comprising the first region of interest;
   send the new version to an object database;
   determine that a similarity value between a shape of an item and the object is greater than a similarity threshold; and
   access the information associated with the object from the object database.

17. The system of claim 12, wherein the at least one processor is further operable to:
   receive second image data representing a second image;
   determine at least one motion vector by comparing the first image and the second image; and
   determine the location based on the at least one motion vector.

18. The system of claim 12, wherein the at least one processor is further operable to:
   receive second image data representing a second image;
   determine a brightness of portions of the second image;
   determine a brightness difference between the portions and sections of the first image; and
   determine the first location based on at least one bright portion of the second image that has a brightness difference greater than a brightness threshold.

* * * * *